UNITED STATES PATENT OFFICE 2,518,419

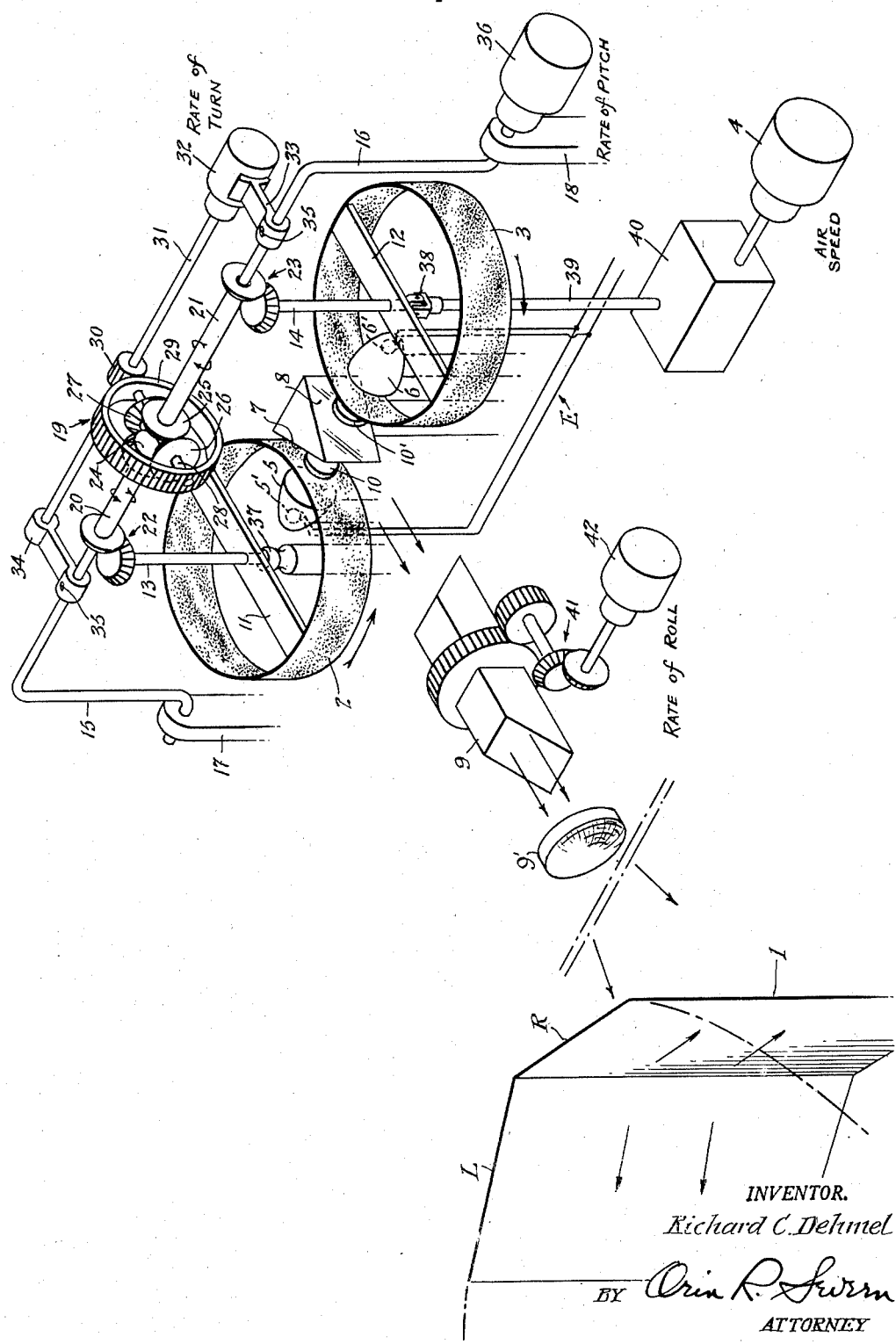

OPTICAL APPARATUS FOR FLIGHT TRAINERS

Richard Carl Dehmel, Short Hills, N. J.

Application April 5, 1948, Serial No. 18,887

6 Claims. (Cl. 35—12)

This invention relates to ground trainers for aircraft pilots and more particularly to trainers of the type having optical means for simulating visual flight conditions by means of views or images projected upon a screen.

It has been proposed to train aircraft pilots by means of optical apparatus arranged to project terrestrial views on a screen in front of the pilot so as to simulate visual conditions at take-off and landing and other maneuvers. The projection apparatus generally is controlled in accordance with the pilot's operation of the aircraft controls so as to simulate roll, bank and pitch, thereby training the pilot in his operation of the controls by means of his visual reactions.

Modern flight training however places considerable emphasis on instrument or "blind" flying and the present invention is intended mainly to supplement blind flying technique by introducing sufficient realism so that the student pilot may be acquainted with common flight conditions, such as for example those experienced in flying through broken clouds for a material length of time. Under such conditions, the pilot is aware of the relative speed of the aircraft and he also can note a material rate of change in the direction of the craft from the speed and direction of light and shadow flashing by at opposite sides respectively of the cockpit cowling.

An object of this invention therefore is to provide improved optical apparatus of the aforesaid type for the training of aircraft pilots, and particularly for supplementing training in blind flying, arranged so that relative air speed, turns, pitch and roll through broken clouds, mist and the like are realistically simulated.

The invention will be more fully set forth in the following description referring to the accompanying drawing, and the features of novelty will be pointed out with particularity in the claims annexed to and forming a part of this specification.

Referring to the drawing the single figure thereof is a partly diagrammatic view in perspective of flight trainer optical apparatus embodying the present invention.

The invention comprises generally a translucent screen 1 which may be conveniently formed of frosted glass as part of the forward cockpit cowling of the trainer on which images are projected by optical apparatus including transparency means such as diapositive elements 2 and 3. These elements are controlled primarily in accordance with simulated air speed as by means of a motor 4 and also in accordance with simulated change in direction by apparatus presently described. The projection apparatus may comprise light sources 5 and 6 disposed adjacent the diapositive elements respectively, reflecting surfaces 7 and 8 located at the opposite sides of the diapositives in line with the respective light source and focusing objective lenses 10 and 10' suitably mounted in spaced relation between the diapositives and reflecting mirrors. A Dove, or equivalent type prism 9 for transmitting light from the reflecting surfaces according to simulated maneuvers is positioned between the reflectors and screen 1. The rays of light from the prism are projected by means of a corrected projection lens 9' on both the right and left sides of the cockpit cowling which is located a suitable distance from the prism as indicated.

In the specific embodiment of my invention illustrated the diapositive elements 2 and 3 are formed as circular bands supported by webs 11 and 12 from normally vertically positioned shafts 13 and 14 respectively. Each diapositive may be composed of a suitable transparency such as a photographic film having cloud images or the like so as to project a pattern of light and shadow. The light sources 5 and 6 comprise electric lamps 5' and 6' respectively energized from a current source E and positioned within parabolic reflectors for transmitting light rays through the diapositive and objective lenses to the reflectors 7 and 8. The objective lens 10 and 10' reverse the image and its movement across the reflectors in the manner disclosed in my patent No. 2,485,435 dated Oct. 18, 1949, which matured from my copending application S. N. 498,906 filed August 14, 1943 for "Aircraft navigating and training apparatus" so that there is corresponding movement of the image across the receiving end of the prism, i. e. from left to right looking toward the screen, taking for example diapositive 3. Subject matter of this general character is disclosed and claimed in my Patent No. 2,474,096 granted June 21, 1949, for "Optical Training Apparatus."

As the Dove prism in the position shown does not reverse the movement of a projected image as to the horizontal direction, and since the projection lens 9' completely reverses the image it will be seen that rotation of the diapositive 3 in a clockwise direction as indicated for example, and rotation of the diapositive 2 in counter-clockwise direction cause the images in light and shadow from diapositive 3 to fall on the right side (R) of the cowling and the images from diapositive 2 to fall on the left side (L) of the cowling, the direction of movement in each case being away from the center or toward the rear as indicated by the direction arrows so as to simulate flying through broken clouds and the like. It will be understood that the expression "light and shadow" as used in the present specification is intended to include images in general, such as those in black and white and in color.

The diapositives 2 and 3 are controlled in accordance with pitch and turn maneuvers in addition to air speed, and for this purpose a pair of pivoted supporting brackets 15 and 16 are mounted in fixed bearings 17 and 18 respectively for supporting a gear differential 19 and a pair of shafts 20 and 21 connected to the differential and by the gearing 22 and 23 to the diapositive elements 2 and 3 respectively. The shafts 20 and 21 are tubular so as to rotate freely on the brackets 15 and 16 and have secured to their ends adjacent each other the drive gears 24 and 25 of the differential, planetary gears 26 and 27 of the differential being freely mounted on a spindle 28 which is secured at its opposite ends to diametrically opposite sides of a ring gear 29. The teeth at the outer surface of the ring gear are in mesh with a pinion 30 that is secured to a shaft 31 driven by a motor 32. The motor 32 is positioned according to simulated turning movement of the aircraft and is suitably mounted on the bracket 16, as by means of a supporting clamp 33. The shaft 31 at its overhanging end is supported in a bearing 34 that is similarly mounted by a clamping support 35 on bracket 15. The brackets 15 and 16 are therefore interconnected for unitary pivotal movement so that the assembly can be tilted by means of a positioning motor 36 which is energized in accordance with simulated rate of pitch of the aircraft.

For the purpose of mounting the diapositives 2 and 3 for tilting in simulation of pitching about the common center line of the bracket pivots at 17 and 18, the shaft 13 is mounted in a fixed socket bearing 37 for universal movement therein, and the other shaft 14 is connected through a universal joint 38 with a drive shaft 39 that is in turn connected to the air speed motor 4 through a suitable gear reducer 40. The bearing 37 and the universal joint 38 are disposed along the aforesaid common center line so that operation of the pitch motor 36 tilts the diapositives as a unit about said center line.

Operation of the air speed motor at a rate corresponding to simulated air speed drives the diapositive 3 directly through shaft 39 and the diapositive 2 indirectly through the gearing 23, shaft 21, gear differential 19, shaft 20, and gearing 22. It will be apparent that when the rate of turn motor 32 is stationary thereby indicating flight along a straight line the gear differential functions as a direct connection so that the diapositives 2 and 3 rotate at the same speed. In case of turn, either to the right or to the left, the turn motor rotates the ring gear 29 of the differential in a corresponding direction so as to increase or decrease the speed of rotation of diapositive 2. Thus the effect of a turn is simulated by images flashing past one side of the cowling at a greater rate than at the opposite side, i. e. at the inside of the turn. As previously indicated, pitching in either vertical direction is simulated in the same manner by the images flashing either generally in upward or downward direction along the cowling.

For the purpose of simulating roll the Dove prism 9 is suitably connected through gearing 41 to a positioning motor 42 that is energized in accordance with the simulated rolling of the aircraft. Since the prism when rotated also rotates the projected image the roll maneuver can be readily simulated in this manner. In view of the fact that the Dove prism rotates the image at twice the speed of rotation of the prism, the gearing 41 is designed to rotate the prism at half speed of that of the shaft of the roll motor 42. In the specific application shown, cloud images and the like are involved so that it is immaterial that the images be inverted. If it is desired that the images be shown in true relation, a second prism can be used in series with prism 9 in the manner disclosed in my aforesaid Patent No. 2,485,435.

The control system for the air speed and other positioning motors is not shown in this application in the interest of clearness since a disclosure thereof is unnecessary for a complete understanding of the present invention. A system that may be used is disclosed in my Patent No. 2,366,603 issued January 2, 1945, for "Aircraft Training Apparatus." For example, the air speed motor 4 may be operated in the manner of the motor ASM, Fig. 7 of the aforesaid patent, the rate of turn motor 32 according to the energization of the rate of turn meter 2, Fig. 3 of the patent, and the pitch and roll motors 36 and 42 according to the energization of the corresponding pitch and roll circuits, Figs. 6 and 4 respectively of the patent. It will be apparent that torque amplifiers of any suitable type may be used where necessary to supply sufficient control torque.

It should be understood that this invention is not limited to specific details of construction and arrangement thereof herein illustrated, and that changes and modifications may occur to one skilled in the art without departing from the spirit of the invention.

What is claimed is:

1. Flight training apparatus comprising a translucent screen representing the forward cowling of a cockpit, a pair of diapositive elements each having images in light and shadow, means for jointly rotating said diapositive elements in opposite directions in accordance with simulated air speed, and light projection means associated with said elements respectively for projecting images in a pair of channels, one for each diapositive element, on opposite sides of said cowling generally in a direction toward the rear thereof so as to simulate relative air speed.

2. Flight training apparatus comprising a screen representing the forward cowling of a cockpit, a pair of diapositive elements each having images in light and shadow, means including differential apparatus for moving said diapositive elements in direction and speed in accordance with simulated air speed and direction, and light projection means associated with said elements respectively for projecting said images on opposite sides of said cowling away from the center thereof so as to simulate relative air speed and change in direction.

3. Flight training apparatus comprising a translucent screen representing the forward cowling of a cockpit, a pair of diapositive elements each having images in light and shadow, means including differential gearing for rotating said diapositive elements respectively in opposite directions in accordance with simulated air speed and rate of turn, and light projection means associated with said elements respectively for projecting said images on opposite sides of said cowling generally away from the center thereof so as to simulate relative air speed and change in direction through broken clouds and the like.

4. Flight training apparatus for student pilots comprising a translucent screen approximately concave in form with respect to the position of the pilot so as to represent the forward cowling of a cockpit, a pair of diapositive elements formed as circular bands each having images in light and shadow, means including differential apparatus for rotating said elements in opposite directions and at different speeds in accordance with simulated air speed and rate of turn, means for controlling the position of said elements in accordance with simulated pitch, and light projection means associated with said elements respectively and controlled in accordance with simulated roll for projecting said images on opposite sides of said cowling generally in a direction toward the rear thereof so as to simulate relative air speed.

5. In flight training apparatus having individual means for simulating air speed and rates of turn, pitch and roll respectively and a screen representing the forward cowling of a cockpit, projection apparatus for projecting on said screen images in light and shadow for simulating flight through broken clouds and the like as distinguished from fixed terrestrial images, said projection apparatus comprising a pair of diapositive means arranged to be moved according to operation of said air speed simulating means, means for modifying the respective movements of said diapositive means according to actuation of said rate of turn means, means for also controlling the position of said diapositive means according to actuation of said rate of pitch means and optical structure for directing said images along a pair of channels, one for each diapositive means, on opposite sides of said screen respectively in opposite directions generally away from the center of said screen and toward the rear thereof, said optical structure including a prism movable about its longitudinal axis according to actuation of said rate of roll means.

6. Flight training apparatus comprising a screen representing the forward cowling of a cockpit, said screen being of approximately concave form with respect to the position of the pilot in said cockpit, diapositive means having images in light and shadow, optical apparatus including a light source arranged with respect to said diapositive means so as to project said images in a pair of channels on opposite sides of said cowling respectively, means for moving said diapositive means according to simulated air speed so that the projected images on said screen move generally in a direction toward the rear thereof so as to simulate movement through broken clouds and the like, and means operatively related to the aforesaid diapositive means and optical apparatus representing rates of simulated turn, pitch and roll respectively for modifying the movement of said images on said screen according to respective changes of said rates.

RICHARD CARL DEHMEL.

REFERENCES CITED

The following references are of record in the file of this patent:

UNITED STATES PATENTS

| Number | Name | Date |
| --- | --- | --- |
| 1,987,625 | Karnes | Jan. 15, 1935 |
| 2,307,840 | MacDonald | Jan. 12, 1943 |
| 2,352,101 | Hutter | June 20, 1944 |
| 2,385,095 | McCarthy | Sept. 18, 1945 |
| 2,409,938 | Hutter | Oct. 22, 1946 |
| 2,413,633 | Jones | Dec. 31, 1946 |
| 2,453,436 | Hertz | Nov. 9, 1948 |
| 2,474,096 | Dehmel | June 21, 1949 |

OTHER REFERENCES

Aviation Week, p. 19, Jan. 19, 1948.